Sept. 22, 1959 J. J. McGLYNN 2,904,880
CLAD METAL PACK AND METHOD OF MAKING THE SAME
Filed Oct. 14, 1955 2 Sheets-Sheet 1
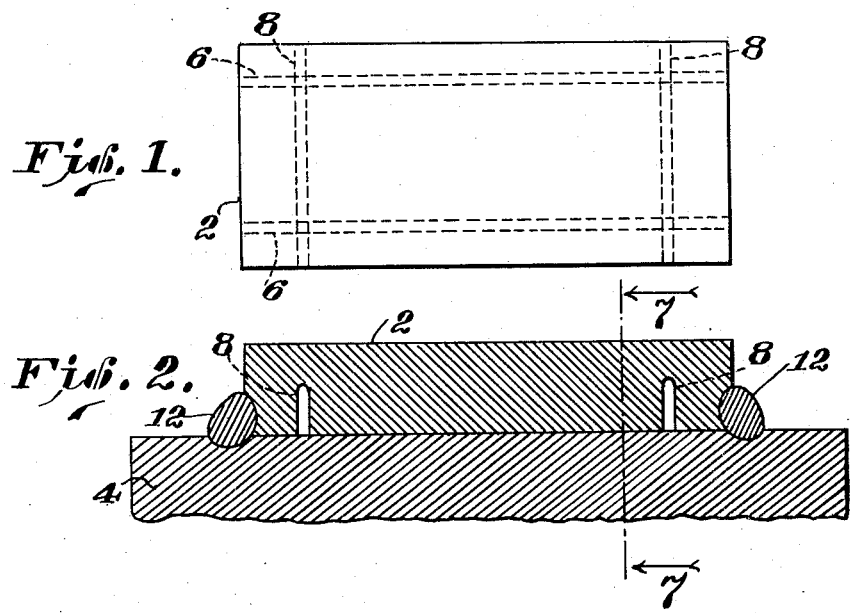
Fig. 1.
Fig. 2.
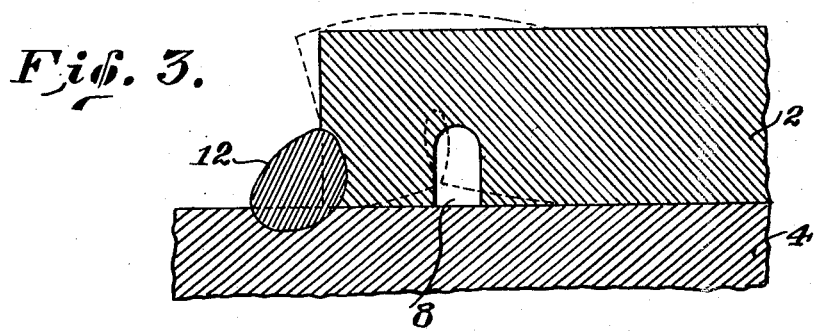
Fig. 3.
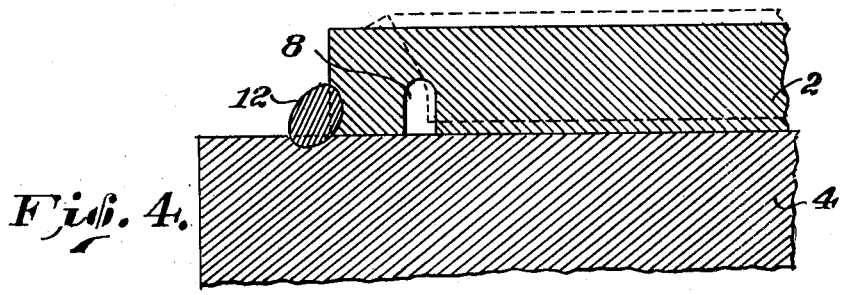
Fig. 4.
INVENTOR.
James J. McGlynn.
BY
Daniel F. Ogo
Attorney.

Sept. 22, 1959 J. J. McGLYNN 2,904,880
CLAD METAL PACK AND METHOD OF MAKING THE SAME
Filed Oct. 14, 1955 2 Sheets-Sheet 2

INVENTOR.
James J. McGlynn.
BY
Daniel E. Dyo
Attorney.

United States Patent Office 2,904,880
Patented Sept. 22, 1959

2,904,880

CLAD METAL PACK AND METHOD OF MAKING THE SAME

James J. McGlynn, Paoli, Pa., assignor to Lukens Steel Company, Coatesville, Pa., a corporation of Pennsylvania Application October 14, 1955, Serial No. 540,458

4 Claims. (Cl. 29—471.5)

This invention relates to the method of making a clad metal pack, and more particularly to a two-ply type of pack assembly in which the insert or cladding sheet is welded to the backing plate.

The principal object of this invention is to provide a method and means of uniting dissimilar metals and preventing rupture of edge welds around the edges of the pack due to differential expansion of the metals.

Another object of this invention is to so locate the welds as to protect the bonding surfaces against high temperature oxidation.

A still further object of the invention is to provide a method of producing a two-ply clad metal pack.

A further object of this invention is to provide the insert or cladding sheet of metal with means to absorb the thermal expansion differential between the two metals forming the metal pack.

Another object of this invention is to provide the cladding sheet with grooves on the side adjacent the backing plate to allow the edges of the sheet to more readily deform and prevent a rupture of the weld at the periphery of the sheet.

These and other objects of the invention will appear hereinafter in the following specification, which, taken with the accompanying drawings, constitutes disclosure of the invention.

In the drawings:

Figure 1 is a top plan view of the insert or cladding sheet which is to be welded to the backing sheet.

Figure 2 is a longitudinal vertical section through the pack showing the end welds and the transverse grooves.

Figure 3 is a view similar to Figure 2 but showing how the upper corner of the cladding sheet and a groove therein are distorted to relieve stress in the sheet as a result of the expansion of the insert.

Figure 4 is a sectional view through the cladding plate and a part of the backing plate showing how the grooves allow other stress relieving actions to take place.

Figure 5:
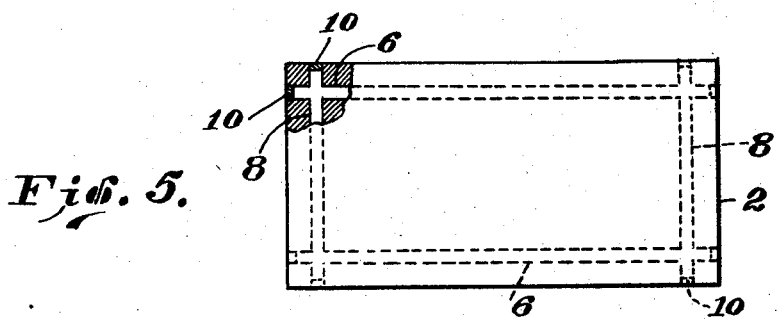
Figure 5 is a plan view similar to Figure 1 with parts broken away and in dotted lines to show how the ends of the grooves are closed by welding material.

While it is the normal practice in the making of much clad or composite steels to use a four-ply or three-ply assembly, it has been found to be advantageous in certain cases to use a two-ply type of assembly in which the cladding sheet, such as stainless steel, is welded to a steel backing plate. In such a two-ply assembly, the weld must be strong enough to overcome yet flexible enough to nullify the stresses due to the differential in thermal expansion between the cladding sheet and the backing plate during the rolling and welding operation in which the sheet and the plate are bonded together. The weld must also protect the bonding surface against high temperature oxidation.

Referring now to the several figures of the drawing, 2 represents the insert or cladding sheet of the pack, and 4 the steel backing plate. The sheet 2 is provided with pairs of spaced parallel grooves 6 and 8 in its lower side, one pair of these grooves is arranged at right angles to and intersects the other pair, as clearly shown in Figures 1, 5 and 6. The sheet 2 and the backing plate 4 are both rectangular in form and the backing plate is of considerably greater length and width than the insert or cladding sheet so that when the sheet is symmetrically arranged on the backing plate its edges will be spaced from the edges of the plate.

Figure 6:
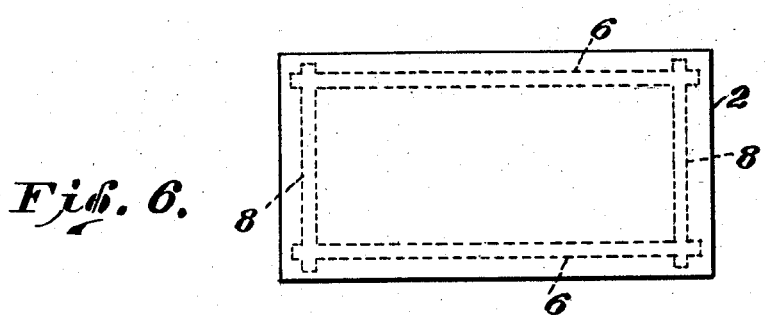
Figure 6 is a view similar to Figure 5 but showing the grooves in dotted lines and their ends closed.
Figure 7:
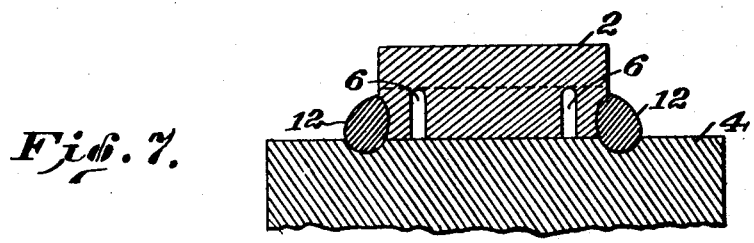
Figure 7 is a view in vertical section of the insert and a portion of the backing plate taken at right angles to the section of Figure 2.
Figure 8:
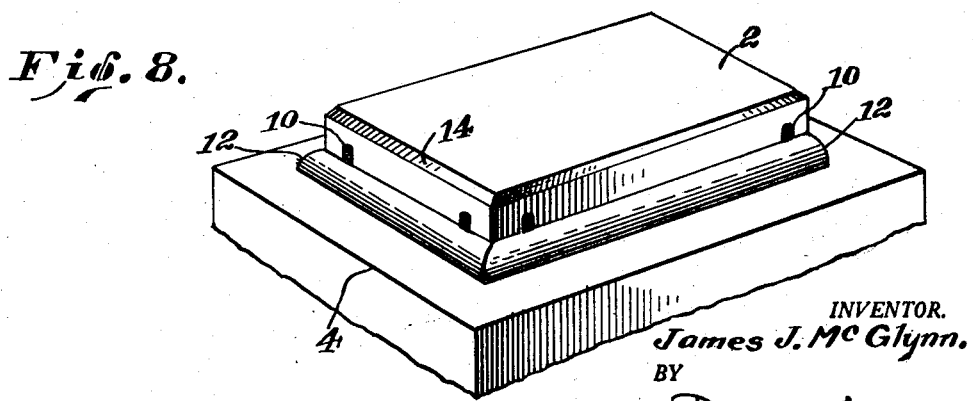
Figure 8 is a perspective view of the completed pack before it is rolled.

As clearly shown in Figures 5 and 8, the ends of the grooves 6 and 8 are closed by welding material 10. A fillet weld 12, as shown in Figures 2, 3, 4, 7 and 8, secures the end and sides of the sheet 2 to the backing plate 4 and extends entirely around the joint between the sheet and the plate in order to seal the assembly. The outer edges of the sheet 2 may be beveled, as shown at 14, after the assembly is completed to prevent tearing action through the groove on the initial rolling of the pack.

As shown in Figures 1, 2, 5, 6 and 7, the grooves are represented as having a width of approximately three-tenths of an inch to take care of a thermal expansion of approximately six-tenths of an inch between a cladding sheet of stainless steel and a steel backing plate at 2200° F. and one hundred inches in length, but it will be understood that this width may be varied for other types and sizes of sheets without involving invention. As shown in Figure 3, the groove allows the edge portion of the cladding sheet to pivot over the weld to the position shown in dotted lines during the rolling and welding operation. This action partially closes the groove and places the weld in compression but prevents its shearing. The groove may also allow other stress relieving actions to take place, as shown in Figure 4, and illustrates the ductile shearing action in the material of the applied sheet as a result of the force of thermal expansion applied to a comparatively small area.

Under certain conditions, depending on the thickness of the cladding sheet and the type of metal used as well as such factors as heat and pressure, the cladding sheet may be distorted to the dotted line position of Figure 4, in which the cladding sheet to the right of the groove 8 will be spaced from the surface of the backing plate.

While the cladding sheet and the backing plate have been shown as being of rectangular form, it is apparent that the invention is not limited to this particular form. Moreover, it will be understood that the invention is not limited to the particular metals mentioned herein.

The above description and drawings disclose one embodiment of the invention, and specific language has been employed in describing the figures. It will, nevertheless, be understood that no limitations of the scope of the invention are thereby contemplated, and that various alterations and modifications may be made as would occur to one skilled in the art to which the invention relates.

I claim:

1. A method of compensating for thermal expansion in the making of a clad metal pack composed of at least one stainless steel cladding sheet welded to a base plate of backing steel which comprises forming grooves on the lower contacting face adjacent the side edges of said stainless steel cladding sheet in the order of approximately three-tenths of an inch in width to take care of each six-tenths of an inch expansion between the cladding sheet and the backing plate per hundred inches in length, placing said cladding sheet of stainless steel on the steel backing plate with the edges of the stainless steel sheet spaced inwardly and parallel to the edges of the backing plate, providing a fillet of weld material around the entire periphery of the cladding sheet to secure the same to the backing plate, the depth of the slot being greater than the height of said weld material above the base plate, the said grooves of such width and depth and being located close enough to the sheet side edges of the sheet whereby to provide yielding portions between the grooves and sheet side edges to thereby compensate for the said differences of thermal expansion of the cladding sheet and said backing plate during heating and rolling operations, and initially heating and rolling the pack until the edge portions of the cladding sheet pivot over the fillet weld and partially close the grooves in the cladding sheet and to place the fillet weld in compression without shearing the same, and thereafter completing the rolling operation at the heated temperature.

2. The method of claim 1 wherein the ends of the grooves are closed with welding material.

3. The method of claim 1 wherein the pack is heated up to about 2200° F. during the heating and rolling operation.

4. The method of claim 1 wherein the outer edges of the cladding sheet are subjected to a beveling step to provide beveled edges prior to providing a fillet of weld material around the entire periphery of the cladding sheet, the said material being deposited on said beveled edges.

References Cited in the file of this patent

UNITED STATES PATENTS

| | | |
|---|---|---|
| 2,813,333 | Pompa | Nov. 19, 1937 |
| 2,423,811 | Goulding | July 8, 1947 |
| 2,468,206 | Keene | Apr. 26, 1949 |
| 2,619,715 | Barr | Dec. 2, 1952 |

FOREIGN PATENTS

| | | |
|---|---|---|
| 407,942 | Great Britain | Mar. 26, 1934 |